(12) United States Patent
Jogetsu et al.

(10) Patent No.: US 9,148,577 B2
(45) Date of Patent: Sep. 29, 2015

(54) INTERCHANGEABLE-LENS CAMERA, AND VIEWFINDER DISPLAY METHOD

(71) Applicant: FUJIFILM Corporation, Tokyo (JP)

(72) Inventors: Tadashi Jogetsu, Saitama (JP); Takeshi Okubo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/508,362

(22) Filed: Oct. 7, 2014

(65) Prior Publication Data

US 2015/0022694 A1 Jan. 22, 2015

Related U.S. Application Data

(63) Continuation of application No. PCT/JP2012/083224, filed on Dec. 21, 2012.

(30) Foreign Application Priority Data

Apr. 10, 2012 (JP) .................. 2012-089545

(51) Int. Cl.
H04N 5/232 (2006.01)
G03B 3/10 (2006.01)
(Continued)

(52) U.S. Cl.
CPC .............. H04N 5/23296 (2013.01); G03B 3/10 (2013.01); G03B 13/06 (2013.01); G03B 17/14 (2013.01); G03B 17/20 (2013.01); G03B 17/565 (2013.01);
(Continued)

(58) Field of Classification Search
CPC .......... H04N 5/23293; H04N 5/23296; H04N 5/23212; G03B 3/10; G03B 17/565
See application file for complete search history.

(56) References Cited

U.S. PATENT DOCUMENTS

2008/0018754 A1* 1/2008 Ejima et al. ................ 348/240.3
2008/0084484 A1 4/2008 Ochi et al.
(Continued)

FOREIGN PATENT DOCUMENTS

JP 11-344746 A 12/1999
JP 2000-275701 A 10/2000
(Continued)

OTHER PUBLICATIONS

International Search Report, mailed Apr. 2, 2013, issued in PCT/JP2012/083224.
(Continued)

Primary Examiner — Lin Ye
Assistant Examiner — John H Morehead, III
(74) Attorney, Agent, or Firm — Birch, Stewart, Kolasch & Birch, LLP

(57) ABSTRACT

The information about an interchangeable lens is acquired, and the size of an image capture range, which is the range corresponding to a capture image in an optical image, is calculated based on the information about the interchangeable lens. When the image capture range is smaller than or equal to a range to be shown by the angular field of the optical image, a first image showing the image capture range in the optical image is displayed on a display device, and when the image capture range is larger than the range to be shown by the angular field of the optical image, a second image different from the first image showing the image capture range in the optical image is displayed on the display device such that the second image is superimposed on at least either of the four corner vicinities and four side vicinities of the optical image.

10 Claims, 11 Drawing Sheets

(51) Int. Cl.
*G03B 13/06* (2006.01)
*G03B 17/14* (2006.01)
*G03B 17/20* (2006.01)
*G03B 17/56* (2006.01)
*H04N 5/272* (2006.01)

(52) U.S. Cl.
CPC ....... *H04N 5/23209* (2013.01); *H04N 5/23212* (2013.01); *H04N 5/23293* (2013.01); *H04N 5/272* (2013.01); *G03B 2206/00* (2013.01)

(56) References Cited

U.S. PATENT DOCUMENTS

| 2009/0135292 | A1* | 5/2009 | Muramatsu | 348/349 |
| 2011/0063478 | A1* | 3/2011 | Yamana | 348/240.2 |
| 2011/0157404 | A1* | 6/2011 | Shiohara | 348/222.1 |
| 2012/0057051 | A1* | 3/2012 | Ito et al. | 348/239 |

FOREIGN PATENT DOCUMENTS

| JP | 2008-96584 A | 4/2008 |
| JP | 2009-200552 A | 9/2009 |
| JP | 2011-186375 A | 9/2011 |
| JP | 2012-63716 A | 3/2012 |

OTHER PUBLICATIONS

Written Opinion of the International Searching Authority, mailed Apr. 2, 2013, issued in PCT/JP2012/083224.

* cited by examiner

INTERCHANGEABLE-LENS CAMERA, AND VIEWFINDER DISPLAY METHOD

CROSS-REFERENCE TO RELATED APPLICATIONS

This application is a Continuation of PCT International Application No. PCT/JP2012/083224 filed on Dec. 21, 2012, which claims priority under 35 U.S.C §119(a) to Japanese Patent Application No. 2012-89545 filed on Apr. 10, 2012. Each of the above application(s) is hereby expressly incorporated by reference, in its entirety, into the present application.

BACKGROUND OF THE INVENTION

1. Field of the Invention

The present invention relates to an interchangeable-lens camera and a viewfinder display method, and particularly to an interchangeable-lens camera and a viewfinder display method that allow a user to easily comprehend that a capture image is broader than the range of an image displayed on a viewfinder, when the capture image is broader than the range of the image displayed on the viewfinder.

2. Description of the Related Art

PTL 1 (Japanese Patent Application Laid-Open No. 2008-96584) discloses an electronic camera that displays a visual-field check image on a monitor in a viewfinder and that superimposes and displays a box showing the range of an image captured by an imaging element for image capture (hereinafter, referred to as the image capture range), on visual-field check image, by an on-screen function.

SUMMARY OF THE INVENTION

However, in the invention described in PTL 1, the visual-field check image is captured by an imaging element different from the imaging element for image capture, and therefore, the image to be viewed on the viewfinder is an electronic image. However, in the electronic image, there is a time lag from the image capture to the display, and further, an optical image is clearer than the electronic image. Therefore, it is desirable that the optical image should be viewed on the viewfinder.

Further, in the invention described in PTL 1, it is assumed that the range of the visual-field check image (the range of the image to be displayed on the viewfinder) is broader than the range of the image (the image capture range) to be captured by the imaging element for image capture, and therefore, the box showing the image capture range is always displayed. Further, it is considered that a camera including a zoom lens may change the size of the box showing the image capture range, in response to a change in the image capture range by a zooming, and may display it on the viewfinder, for allowing a user to check the image capture range. In this case, when the zooming is performed to the wide side, the box showing the image capture range, which is displayed on the viewfinder, gradually becomes large in size, and when exceeding the range of the visual-field check image, the box showing the image capture range disappears from the viewfinder. Thereby, a user can recognize that the image capture range has become larger than the range of the image displayed on the viewfinder.

However, in a camera whose lens is interchangeable, there is a possibility that the image capture range is broader than the range of the image to be displayed on the viewfinder, in the initial state after the power activation or the lens interchange. In such a case, at any time, the box showing the image capture range is not displayed on the viewfinder. Accordingly, there is a problem in that a user cannot intuitively recognize that the image capture range is larger than the optical image.

The present invention, which has been made in view of such circumstances, has an object to provide an interchangeable-lens camera and a viewfinder display method that allow a user to easily comprehend that the image capture range is broader than the range of the image displayed on the viewfinder, when the image capture range is broader than the range of the image displayed on the viewfinder, in the camera whose lens is interchangeable.

For achieving the above object, an interchangeable-lens camera according to an aspect of the present invention includes: a camera mount on which an interchangeable lens is mounted; an image capture device for acquiring a capture image, based on subject light transmitted through the interchangeable lens; an optical viewfinder for leading a rectangular optical image of a subject to an eyepiece unit, through a path different from the capture image; a display device for displaying an image; an image superimposition device for superimposing the image displayed by the display device on the optical image, and leading the image to the eyepiece unit; an acquisition device for acquiring information about the interchangeable lens mounted on the camera mount; an image capture range determination device for determining an image capture range in the optical image, based on the acquired information about the interchangeable lens, the image capture range being a range corresponding to the capture image; and a display control device for making the display device display a first image, when the image capture range is smaller than or equal to a range to be shown by an angular field of the optical image, and making the display device display a second image such that the second image is superimposed on at least either of four corner vicinities and four side vicinities of the optical image, when the image capture range is larger than the range to be shown by the angular field of the optical image, the first image showing the image capture range in the optical image, the second image being different from the first image.

Here, in the interchangeable-lens camera according to the aspect, the "rectangular" shape is not limited to a completely rectangular shape, and includes an incomplete shape in which the four corners are rounded, for example.

In the interchangeable-lens camera according to an aspect of the present invention, the information about the interchangeable lens is acquired, and the size of the image capture range, which is the range corresponding to the capture image in the optical image, is calculated based on the acquired information about the interchangeable lens. When the image capture range is smaller than or equal to the range to be shown by the angular field of the optical image, the first image showing the image capture range in the optical image is displayed on the display device, and when the image capture range is larger than the range to be shown by the angular field of the optical image, the second image different from the first image showing the image capture range in the optical image is displayed on the display device such that the second image is superimposed on at least either of the four corner vicinities and four side vicinities of the optical image. As a result, depending on the size of the image capture range, the first image or the second image is displayed so as to be overlapped on the optical image. Thereby, when the image capture range is smaller than the optical image, a user can easily comprehend the image capture range. Further, when the image capture range is broader than the optical image, a user can easily comprehend that the image capture range is broader than the optical image.

In an interchangeable-lens camera according to an alternative aspect of the present invention, the image capture range determination device may calculate an extent by which the image capture range exceeds the range to be shown by the angular field of the optical image, and the display control device may alter at least one of size, color, brightness and shape of the second image, based on the calculated extent by which the image capture range exceeds the range to be shown by the angular field of the optical image. Thereby, a user can easily comprehend the extent by which the image capture range exceeds the angular field of the optical image.

In an interchangeable-lens camera according to an alternative aspect of the present invention, the display control unit may make the display device display an image showing a relation between the image capture range and the range to be shown by the angular field of the optical image, when the image capture range is larger than the range to be shown by the angular field of the optical image. Thereby, a user can intuitively comprehend the extent by which the image capture range exceeds the angular field of the optical image.

In an interchangeable-lens camera according to an alternative aspect of the present invention, the display control device may display an image containing an index, as the second image, the index having a shape in which a pointed end is oriented outward. Thereby, a user can intuitively comprehend that the image capture range is broader than the optical image.

In an interchangeable-lens camera according to an alternative aspect of the present invention, the display control device may display an image containing an L-shape, as the second image, the L-shape being along a corner of the display device. Thereby, a user can intuitively comprehend that the image capture range is broader than the optical image. Here, in the interchangeable-lens camera according to the aspect, the "L-shape" is not limited to a shape that completely coincides with the capital "L" of the alphabet. For example, the two line segments orthogonal to each other may be equal in length, or either line segment may be longer. Further, the two line segments may not be completely orthogonal.

An interchangeable-lens camera according to an alternative aspect of the present invention may include an image capture indication unit that indicates an image capture preparation behavior at the time of a half-push and indicates an image capture behavior at the time of a full-push, and the display control unit may keep the display device from displaying the second image, when the half-push of the image capture indication unit is performed. Thereby, unnecessary information can be eliminated from the viewfinder.

In an interchangeable-lens camera according to an alternative aspect of the present invention, the display control device may make the display device display the capture image acquired by the image capture device.

An interchangeable-lens camera according to an alternative aspect of the present invention may include an operation unit for indicating a direction in the optical image, and, when the direction is indicated by the operation unit, the display control device may make the display device display an image (hereinafter, referred to as a "run-over image") that is in the capture image and in regions beyond the range to be shown by the angular field of the optical image, and that corresponds to a region exceeding the range to be shown by the angular field of the optical image in the indicated direction. Thereby, a user can check a region of the capture image that cannot be checked on the optical image.

An interchangeable-lens camera according to an alternative aspect of the present invention may make the display device display the run-over image such that the run-over image is superimposed on an edge part in the indicated direction of the optical image.

An interchangeable-lens camera according to an alternative aspect of the present invention may include: a light-blocking device disposed on an optical path in the optical viewfinder, the light-blocking device being able to switch between a light-blocking state and a non-light-blocking state for each region, the light-blocking state being a state in which the optical image cannot be viewed through the eyepiece unit; and a control device for putting a region of the light-blocking device into the light-blocking state, when the run-over image is displayed on the display device, the region of the light-blocking device corresponding to a region where the run-over image is displayed. Thereby, the nm-over image can be displayed so as to be easily seen.

In an interchangeable-lens camera according to an alternative aspect of the present invention, the optical viewfinder may include a viewfinder magnification alternation device for altering the magnification of the optical image when the first image is smaller than a predetermined size. Thereby, it is possible to easily see the optical image.

A viewfinder display method according to an aspect of the present invention is performed by an interchangeable-lens camera including: an image capture device for acquiring a capture image, based on subject light transmitted through an interchangeable lens that is mounted by intermediary of a camera mount; an optical viewfinder for leading a rectangular optical image of a subject to an eyepiece unit, through a path different from the interchangeable lens; a display device; and an image superimposition device for superimposing the image displayed by the display device on the optical image, and leading the image to the eyepiece unit. The viewfinder display method includes; a step for acquiring information about the interchangeable lens mounted on the camera mount; a step for determining an image capture range in the optical image, based on the acquired information about the interchangeable lens, the image capture range being a range corresponding to the capture image; and a step for making the display device display a first image, when the image capture range is smaller than or equal to a range to be shown by an angular field of the optical image, and making the display device display a second image such that the second image is superimposed on at least one of four corner vicinities and four side vicinities of the optical image, when the image capture range is larger than the range to be shown by the angular field of the optical image, the first image showing the image capture range in the optical image, the second image being different from the first image. Thereby, when the image capture range is smaller than the optical image, a user can easily comprehend the image capture range. Further, when the image capture range is broader than the optical image, a user can easily comprehend that the image capture range is broader than the optical image.

According to the present invention, in a camera whose lens is interchangeable, a user can easily comprehend that an image capture range is broader than the range of an image displayed on a viewfinder, when the image capture range is broader than the range of the image displayed on the viewfinder.

DETAILED DESCRIPTION OF THE PREFERRED EMBODIMENTS

Hereinafter, embodiments of an interchangeable-lens camera and a viewfinder display method according to the present invention are explained in detail, with reference to the accompanying drawings.

First Embodiment

Configuration of Imaging Apparatus

Figure 1:
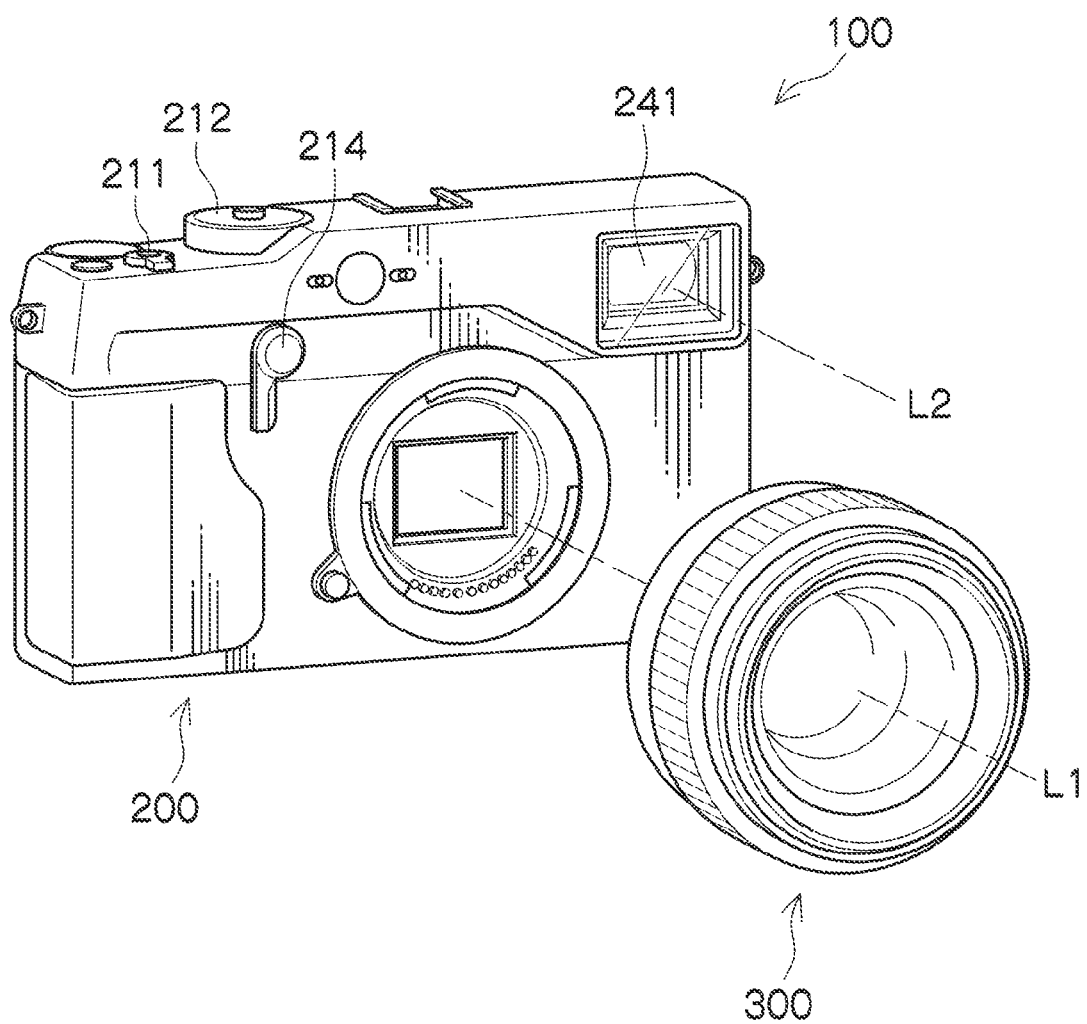
FIG. 1 is a front perspective view of an imaging apparatus 100 according to an embodiment of the present invention.
Figure 2:
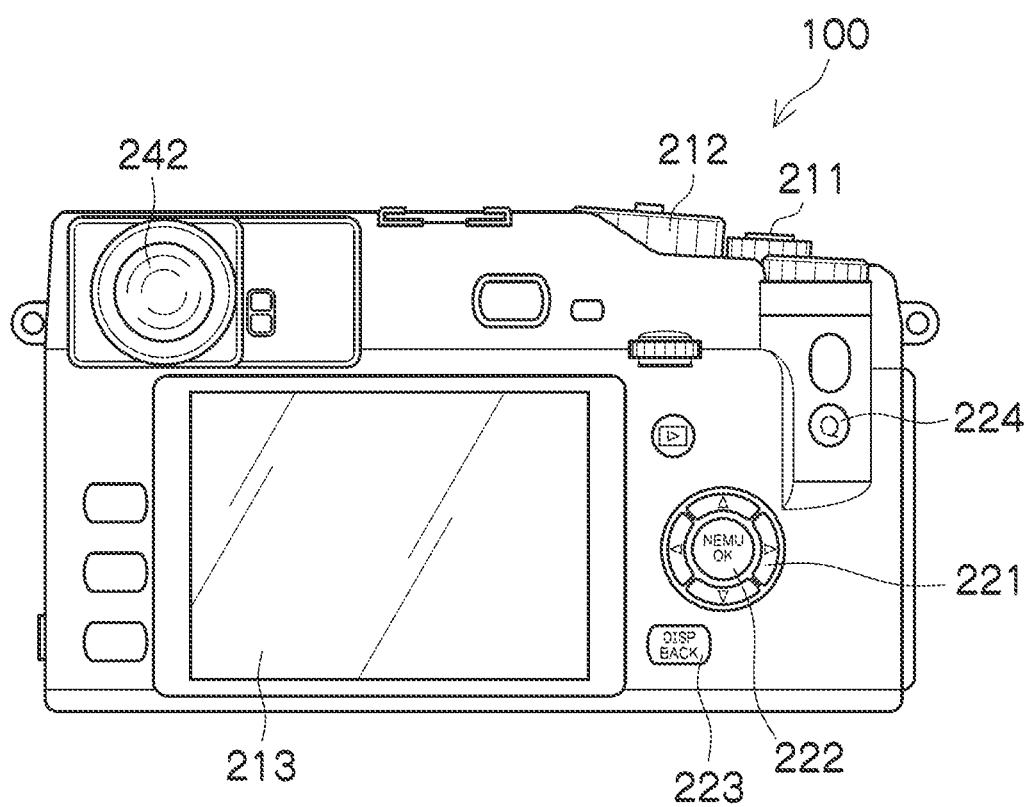
FIG. 2 is a back view of the imaging apparatus 100.

FIG. 1 is a front perspective view of an imaging apparatus 100 that is an interchangeable-lens camera according to an embodiment of the present invention, and FIG. 2 is a back view of the imaging apparatus 100. The imaging apparatus 100 is constituted by a camera body 200 (camera body), and an interchangeable lens 300 (lens apparatus) to be interchangeably mounted on the camera body 200. A mount 256 (camera mount) included in the camera body 200 (see FIG. 6) and a mount 346 on the interchangeable lens 300 side corresponding to the mount 256 (see FIG. 6) are connected, and thereby, the camera body 200 and the interchangeable lens 300 can be mounted interchangeably.

On the front surface of the camera body 200, a viewfinder window 241 of a viewfinder 240 (the detail is described later), a viewfinder switching lever 214 and the like are provided, in addition to the mount 256. Here, an optical axis L2 of the viewfinder 240 is an optical axis that is different from an optical axis L1 of the interchangeable lens 300. Further, on the top surface of the camera body 200, a release button 211 (image capture indication unit) and a dial 212 for image capture mode setting are mainly provided.

The release button 211, which is an operation device for inputting an indication of an image capture start, is configured as a two-step stroke type switch that allows for a so-called "half-push" and "full-push". The imaging apparatus 100 outputs an S1-ON signal when the half-push of the release switch is performed, and outputs an S2-ON signal when the full-push is performed by a further pushing from the half-push. Once the S1-ON signal is output, image capture preparation processes such as an automatic focus adjustment (AF process) and an automatic exposure control (AE process) are executed, and once the S2-ON signal is output, an image capture process is executed. Here, the release button 211 is not limited to the form of the two-step stroke type switch that allows for the half-push and the full-push. The S1-ON signal and the S2-ON signal may be output by a one-time operation, or individual switches may be respectively provided for the output of the S1-ON signal and S2-ON signal. Further, in a form in which the operation indication is performed through a touch panel or the like, as the operation device, by touching a region corresponding to an operation indication to be displayed on the screen of the touch panel, the operation indication may be output. In the present invention, the form of the operation device is not limited to these, as long as the image capture preparation behavior and the image capture behavior are indicated. Further, the image capture preparation behavior and the image capture behavior may be sequentially executed by the operation indication to a single operation device.

On the back surface of the camera body 200, a viewfinder eyepiece unit 242, a monitor 213, a MENU/OK key 222, a cross key 221 (direction indication button), a BACK key 223 and a Q button 224 are mainly provided.

The MENU/OK key 222 is an operation key having both of a function as a menu button for commanding the display of a menu on the screen of the monitor 213 and a function as an OK button for commanding the decision and execution of a selected content. The cross key 221 is an operation unit for inputting indications for four directions: the upward direction, the downward direction, the leftward direction and the rightward direction, and functions as a button (cursor-movement operation device) for selecting an item from a menu screen, or for indicating the selection of various setting items from each menu. Further, the upward/downward keys of the cross key 221 function as a zoom switch at the time of image capture or as a playback zoom switch at the time of the playback mode, and the leftward/rightward keys function as a frame advance (forward directional/backward directional advance) button at the time of the playback mode. The BACK key 223 is used for the deletion of an intended target such as a selected item, the cancel of an indication content, the restoration to the last operation state, or the like. The Q button 224 functions as a button for commanding the display of an intended menu screen on the screen of the monitor 213.

Figure 3:
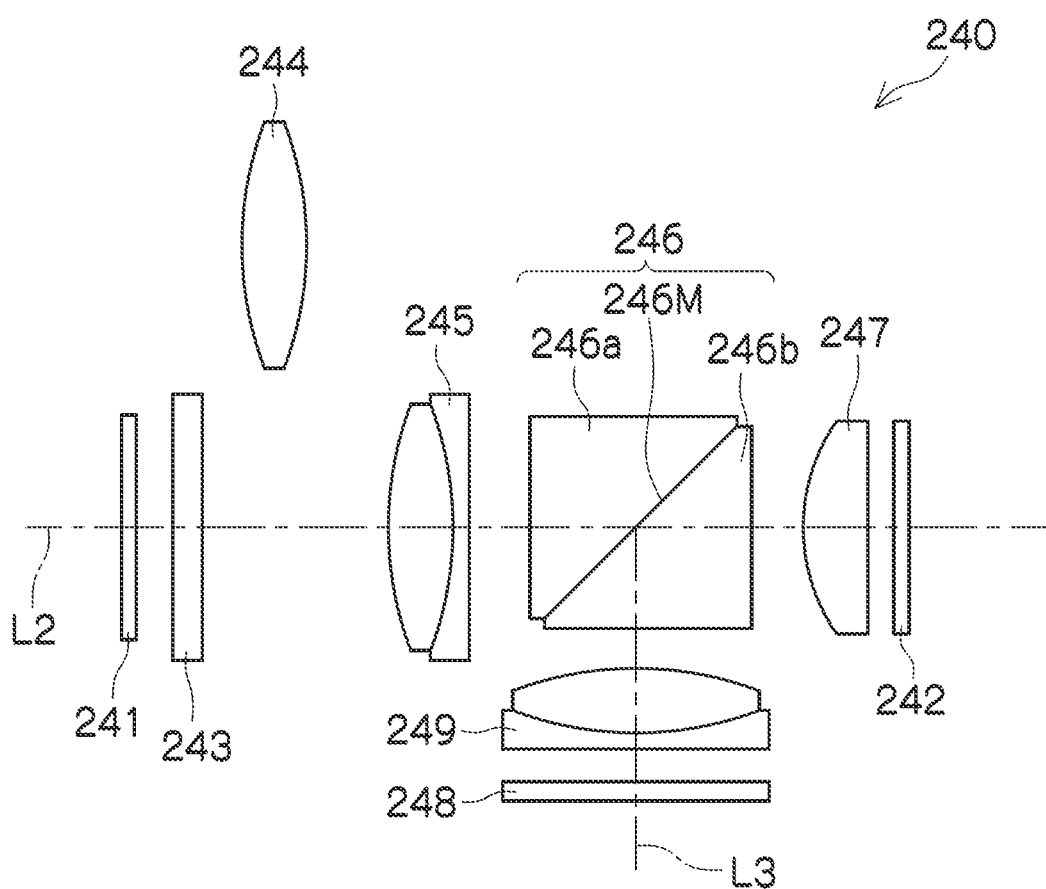
FIG. 3 is a principal part configuration diagram of a viewfinder.
Figure 4:
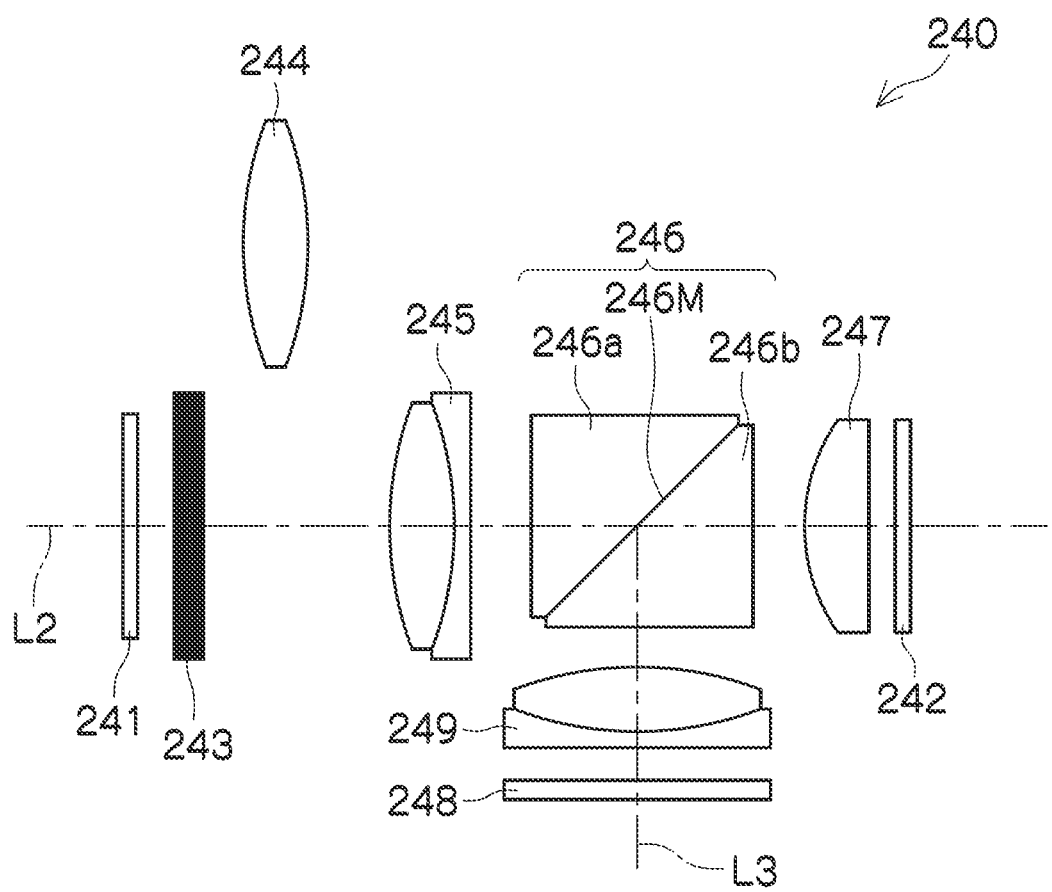
FIG. 4 is a principal part configuration diagram of the viewfinder, and shows a case where a liquid crystal shutter is in a light-blocking state.
Figure 5:
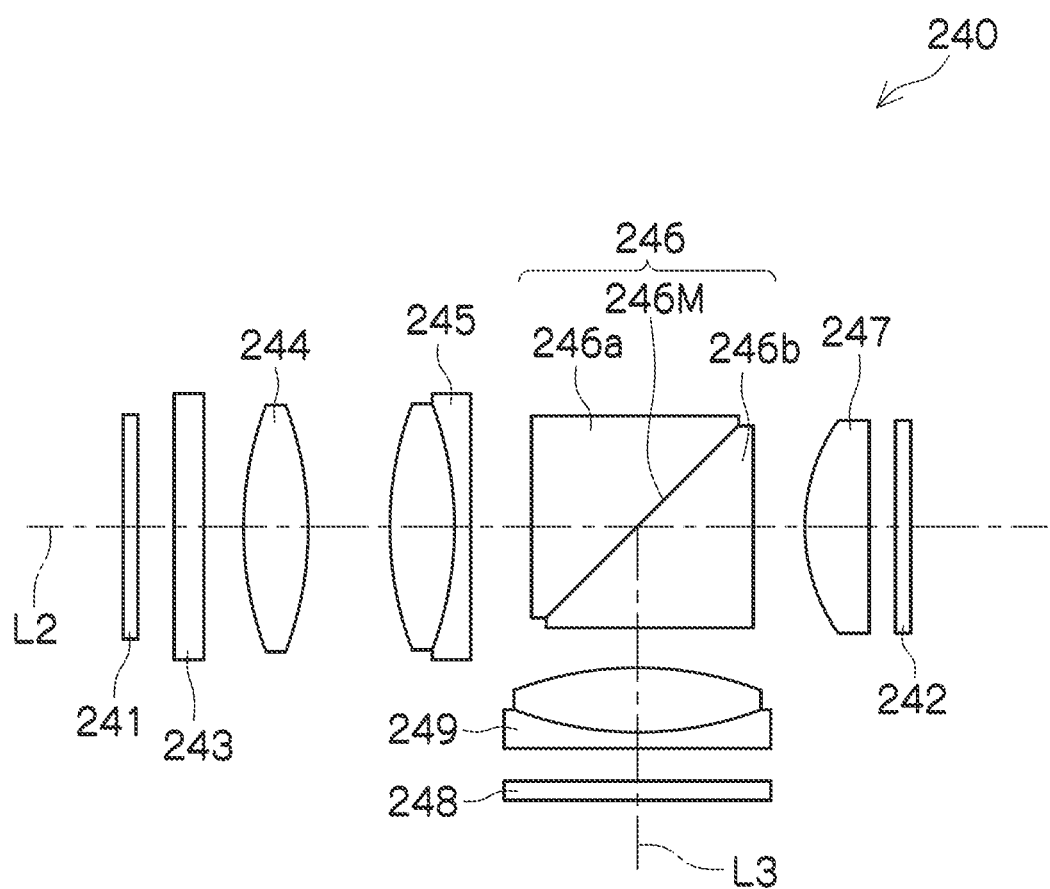
FIG. 5 is a principal part configuration diagram of the viewfinder, and shows a case where a viewfinder variable-magnification lens is on a light axis L2.

FIGS. 3 to 5 are schematic diagrams showing an optical system of the viewfinder 240. FIGS. 3 and 5 show a state in which an optical image can be viewed, and FIG. 4 shows a state in which an electronic image can be viewed.

The viewfinder 240 is constituted mainly by the viewfinder window 241, the viewfinder eyepiece unit 242, a liquid crystal shutter 243, a viewfinder variable-magnification lens 244, an objective lens 245, a prism 246, an eyepiece lens 247, a liquid crystal plate 248 and a liquid crystal plate lens 249.

The viewfinder window 241, the viewfinder eyepiece unit 242, the liquid crystal shutter 243, the objective lens 245, the prism 246 and the eyepiece lens 247 are disposed on the optical axis L2. The subject light transmitted through the viewfinder window 241, the liquid crystal shutter 243, the objective lens 245 and the prism 246 is led to the viewfinder eyepiece unit 242, by the eyepiece lens 247. As a result, the optical image of the subject can be viewed from the viewfinder eyepiece unit 242. That is, the viewfinder window 241, the liquid crystal shutter 243, the objective lens 245, the prism 246, the eyepiece lens 247, and the viewfinder eyepiece unit 242 (eyepiece unit) function as an optical viewfinder (optical viewfinder).

The viewfinder variable-magnification lens 244 is provided so as to be parallel movable between the position shown in FIG. 3 and the position on the optical axis L2 shown in FIG. 5. When the state in which the viewfinder variable-magnification lens 244 is not on the optical axis L2 as shown in FIG. 3 is changed into the state in which the viewfinder variable-magnification lens 244 is on the optical axis L2 as shown in FIG. 5, the optical image to be observed from the viewfinder eyepiece unit 242 is magnified.

The liquid crystal shutter 243 (light-blocking device) is provided on the back surface of the viewfinder window 241, perpendicularly to the optical axis L2 for the subject light that has entered the viewfinder window 241. The liquid crystal shutter 243 is a liquid crystal panel that includes a liquid crystal layer encapsulated between a pair of substrates and that changes the polarization direction depending on the voltage to be applied to the liquid crystal layer. The liquid crystal shutter 243, which is, for example, a liquid crystal panel having a resolution of 1600×900 pixels, is configured so as to be capable of switching for each pixel between a light-blocking state in which the subject light having entered the viewfinder window 241 is blocked as shown in FIG. 4 and a transmission state (non-light-blocking state) in which the subject light is transmitted, by the control from a shutter control unit 239 (see FIG. 6). That is, for each region on the liquid crystal shutter 243, the light-blocking state and the non-light-blocking state are switched, and thereby, for each region in the optical image of the subject light, the light-blocking state and the non-light-blocking state are switched.

Here, although the example uses the liquid crystal shutter 243, the light-blocking state and the non-light-blocking state may be switched by the insertion-extraction of a light-blocking plate to the optical path in the optical axis direction. The light-blocking plate does not allow for partial light blocking, but in the transmission state, results in a better visibility than the case of using the liquid crystal shutter, because there is no liquid crystal shutter on the optical path.

The liquid crystal plate 248 (display device) is a liquid crystal panel having a resolution of 1600×900 pixels, which is the same as the resolution of the liquid crystal shutter 243. By the control from the display control unit 210 (see FIG. 6), a frame box showing an image capture range, which is the range of the subject light having entered the light-receiving surface of an imaging element 202, is displayed on the liquid crystal plate 248, based on the focal distance (angular field) of the interchangeable lens 300. Further, by the control from the display control unit 210 (see FIG. 6), the inverted image of the subject image can be also displayed on the liquid crystal plate 248.

The image displayed on the liquid crystal plate 248 is transmitted through the liquid crystal plate lens 249 that is provided on an optical axis L3 and that is present on the optical axis L3, and enters the prism 246 (image superimposition device).

The prism 246 is constituted by a first prism 246a and a second prism 246b, and a half mirror surface 246M is formed at a portion where the first prism 246a and the second prism 246b are joined. The half mirror surface 246M is provided so as to be inclined at 45' with respect to the optical axis L3 of the liquid crystal plate lens 249. The image displayed on the liquid crystal plate 248 is magnified by the liquid crystal plate lens 249, and is horizontally inverted by the half mirror surface 246M to be reflected in the rightward direction of the figure. The image (erected normal image) reflected by the half mirror surface 246M is transmitted through the eyepiece lens 247, and is led to the viewfinder eyepiece unit 242.

Figure 6:
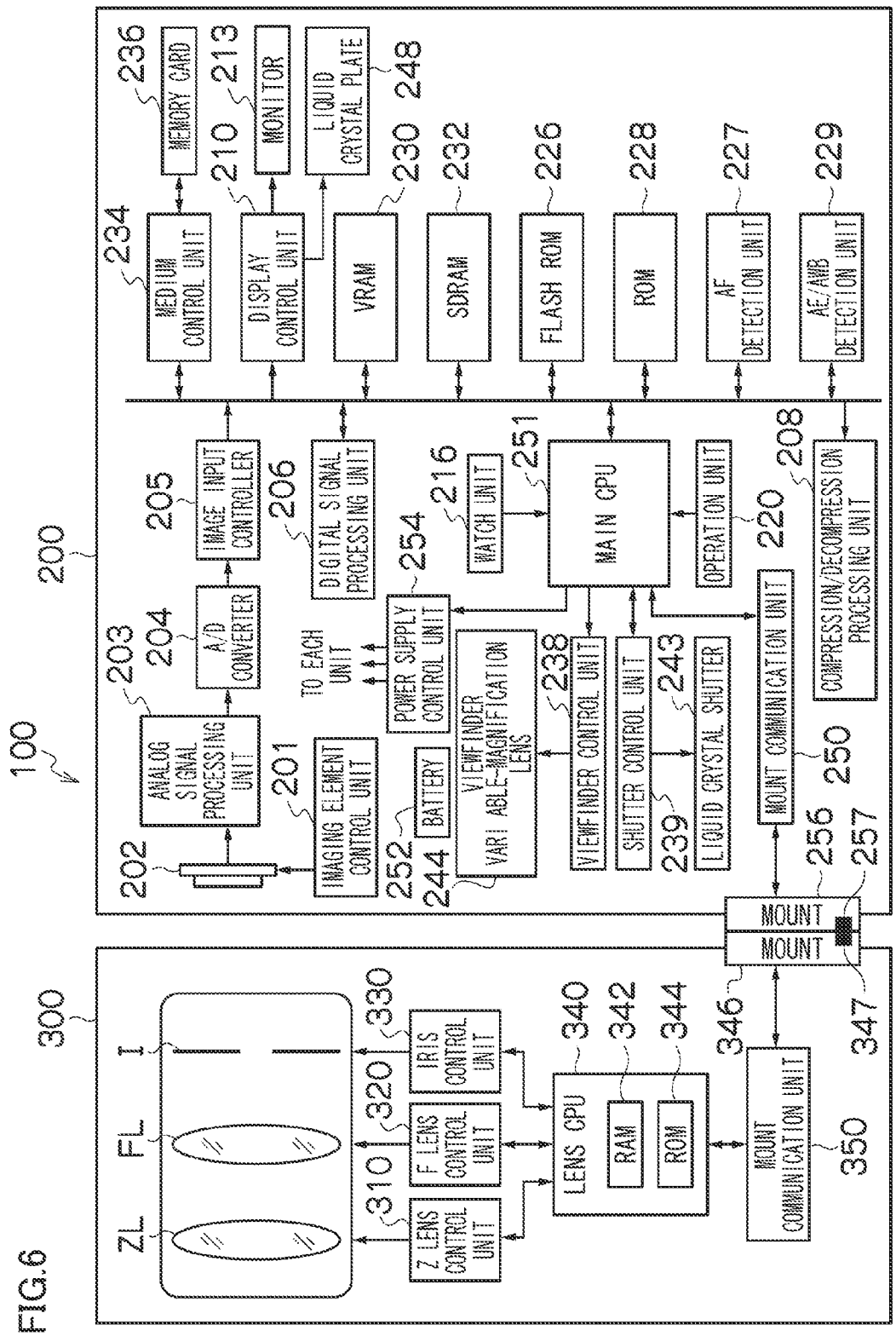
FIG. 6 is a block diagram showing a principal part configuration of the imaging apparatus 100.

FIG. 6 is a block diagram showing the configuration of the imaging apparatus 100. The behavior of the imaging apparatus 100 is integrally controlled by a main CPU 251 of the camera body 200 and a lens CPU 340 of the interchangeable lens 300.

The main CPU 251 expands a camera control program stored in a flash ROM 226, into an SDRAM 232, and executes various processes while using the SDRAM 232 as a work memory. Further, the lens CPU 340 expands a camera control program stored in a ROM 344, into a RAM 342, and executes various processes while using the RAM 342 as a work memory. The SDRAM 232 is utilized as a calculation work area for the main CPU 251, and also, is utilized as a temporary storage area for image data. In the flash ROM 226, control programs to be executed by the main CPU 251, various data necessary for the control, and the like are stored. In the ROM 228, a variety of setting information, such as user setting information, that is relevant to the behavior of the digital camera, and the like are stored.

When a user operates an operation unit 220 that includes the MENU/OK key 222, the cross key 221, the BACK key 223 and the like, a signal from the operation unit 220 is input to the main CPU 251. Based on the input signal, the main CPU 251 controls the circuits of the camera body 200, and therewith, performs the sending and receiving of signals with the interchangeable lens 300, through the mount 256 and a mount communication unit 250, as described later.

The mount 256 is provided with a terminal 257, and the mount 346 is provided with a terminal 347. When the interchangeable lens 300 is mounted on the camera body 200, the terminal 257 and the terminal 347, which correspond, are contacted, and thereby, the communication becomes possible. Here, in the present invention, the positions and numbers of the terminal 257 and terminal 347 are not particularly limited. The camera body 200 and the interchangeable lens 300 communicates, therebetween, a drive command, various control statuses (lens drive start/completion notices, and the like), the setting information of the lens, and the like. The above described terminal includes, for example, an earth terminal, a synchronous signal terminal, a serial communication terminal, a control status communication terminal, and a terminal for supplying power from a battery 252 of the camera body 200 to each unit of the interchangeable lens 300.

The interchangeable lens 300 is constituted mainly by a zoom lens ZL, a focus lens FL, an iris I, the lens CPU 340 and the like.

The zoom lens ZL and the focus lens FL move on the same optical axis, forward and backward, and perform zooming and focusing. The zoom lens ZL is driven by a zoom lens control unit 310 so that the focal distance is altered. In response to a zoom lever operation by a user, the main CPU 251 moves the zoom lens ZL in the interchangeable lens 300 to alter the focal distance. The focus lens FL is driven by a focus lens control unit 320.

The iris I controls the quantity of the light to enter the imaging element 202, and controls the exposure along with the shutter speed. The iris I includes, for example, five iris blades, and the iris control is performed in six levels within iris values of F1.4 to F11, with 1-AV increments. The iris I is driven by an iris control unit 330 so that the opening quantity is adjusted.

The lens CPU 340 determines the movement quantities of the zoom lens ZL and the focus lens FL, based on the current positions in the optical axis L1 direction of the zoom lens ZL and the focus lens FL, which are detected by a position sensor (not shown in the figure), a lens target position, and a lens adjustment EEPROM value of the setting information for the interchangeable lens 300, which is expanded from ROM 344 into the RAM 342.

In accordance with a command from the lens CPU 340, the zoom lens control unit 310 moves the zoom lens ZL in the optical axis L1 direction, and thereby, the image capture magnification can be changed. Further, in accordance with a command from the lens CPU 340, the focus lens control unit 320 moves the focus lens FL forward and backward along the optical axis L1 direction, and performs the focusing to a subject. The iris control unit 330 alters the iris value of the iris I, in accordance with a command from the lens CPU 340.

The imaging element 202 (image capture device) is disposed at the subsequent stage of the zoom lens ZL, the focus lens FL and the iris I, and receives the subject light transmitted through the zoom lens ZL, the focus lens FL and the iris I. The imaging element 202 includes a light-receiving surface on which many light-receiving elements are arrayed in a matrix. The subject light transmitted through the zoom lens ZL, the focus lens FL and the iris I forms an image on the light-receiving surface of the imaging element 202, and is converted into an electric signal by each light-receiving element. Here, as the imaging element 202, a variety of photoelectric conversion elements such as a CMOS and a CCD can be used.

The imaging element 202 outputs electric charges accumulated in each of the pixels, on a line basis, as a serial image signal, synchronously with a vertical transfer clock and a horizontal transfer clock that are supplied from an imaging element control unit 201. The main CPU 251 controls the imaging element control unit 201 and controls the drive of the imaging element 202.

Here, the electric charge accumulation time (exposure time) in each of the pixels is determined by an electronic shutter drive signal that is given from the imaging element control unit 201. The main CPU 251 indicates the electric charge accumulation time to the imaging element control unit 201.

Further, when the imaging apparatus 100 is set to the image capture mode, the output of the image signal starts. That is, when the imaging apparatus 100 is set to the image capture mode, for displaying a through image (live view image) on the monitor 213, the output of the image signal starts. The output of the image signal for the through image is temporarily stops when the actual image capture is indicated, and starts again when the actual image capture is completed.

The image signal to be output from the imaging element 202 is an analog signal, and this analog image signal is taken in an analog signal processing unit 203 (image capture device).

The analog signal processing unit 203 is configured to include a correlated double sampling circuit (CDS) and an automatic gain control circuit (AGC). The CDS removes the noise contained in the image signal, and the AGC amplifies the image signal after the noise removal. The analog image signal after necessary signal processes are performed in the analog signal processing unit 203 is taken in an A/D converter 204 (image capture device).

The A/D converter 204 converts the taken analog image signal into a digital image signal that has a gradation range of predetermined bits. This image signal, which is so-called RAW data, has gradation values showing the concentrations of R, G and B for each pixel.

An image input controller 205 (image capture device) incorporates therein a line buffer with a predetermined capacity, and accumulates the one-frame image signal output from the A/D converter 204. The one-frame image signal accumulated in the image input controller 205 is stored in the SDRAM 232.

The one-frame image signal stored in the SDRAM 232 is taken in a digital signal processing unit 206 (image capture device), in a point sequence manner (in the order of the pixels).

The digital signal processing unit 206 performs a signal process to the image signal for each color of R, G and B that has been taken in a point sequence manner, and generates an image signal (Y/C signal) composed of a luminance signal Y and color difference signals Cr, Cb.

In accordance with a command of the main CPU 251, an AF detection unit 227 takes in the image signals of R, G and B that are stored in the SDRAM 232, and calculates a focus evaluation value necessary for the AF (Automatic Focus) control. The AF detection unit 227 includes a high-pass filter through which only high frequency components of the G signal can pass, an absolute value generation processing unit, an AF area extraction unit to cut out the signals in a focus area (hereinafter, referred to as an AF area) set on the screen, and an integration unit to integrate absolute value data in the AF area, and outputs the absolute value data in the AF area integrated in the integration unit, to the main CPU 251, as the focus evaluation value. As the control scheme of the focus lens FL based on the focus evaluation value, a scheme of searching a position to maximize the focus evaluation value and moving the focus lens FL to the position, or a hill climbing scheme of moving the focus lens FL in the direction of increase in the focus evaluation value, detecting a point at which the focus evaluation value starts to decrease and setting the focus lens group to the position, can be used. Alternatively, a phase difference scheme of separately providing an imaging element for the phase difference AF using phase difference and performing the AF using the phase difference detected by the imaging element for the phase difference AF may be used.

An AE/AWB detection unit 229 takes in the image signals of R, G and B that are stored in the SDRAM 232, and integrates the G signals in the whole screen, or integrates the G signals that are weighted differently between the central part of the screen and the edge part of the screen, to output the integrated value necessary for the AE control, to the main CPU 251. The main CPU 251 calculates the luminance value from the integrated value, and determines the exposure value from the luminance value. Further, the iris value and the shutter speed are determined from the exposure value, in accordance with a program chart.

Further, the AE/AWB detection unit 229 divides the single screen into multiple areas (for example, 16×16), as a physical quantity necessary for the AWB control, and, for each division area, calculates the average integrated value of the image signal for each color of R, G and B. From the obtained R integrated value, B integrated value and G integrated value, the main CPU 251 determines the R/G and B/G ratios for each division area, and discriminates the light source type, based on the R/G and B/G distributions in the color space of the obtained R/G and BIG values, and the like. Then, in accordance with a white balance adjustment value suitable for the discriminated light source type, gain values (white balance correction values) for the R, G and B signals in a white balance adjustment circuit are determined such that, for example, the value of each ratio is approximately 1 (that is, the integration ratio of RGB in the single screen is R:G:B=1: 1:1). The AE/AWB detection unit 229 performs the white balance adjustment, by applying the digital gain depending on the light source type, to the one-frame image signal stored in the SDRAM 232, and therewith, performs the gamma (gradation property) process and the sharpness process to generate R, G and B signals.

In accordance with a command from the main CPU 251, a compression/decompression processing unit 208 performs the compression process to the image data generated in the digital signal processing unit 206, to generate compressed image data, and performs the decompression process to the compressed image data, to generate uncompressed image data.

In accordance with a command from the main CPU 251, a medium control unit 234 records image data obtained by image capture, in a memory card 236, and reads recorded images from the memory card 236.

In accordance with a command from the main CPU 251, the display control unit 210 (display control device) controls the displays on the monitor 213 and the liquid crystal plate 248.

A viewfinder control unit 238 drives the viewfinder variable-magnification lens 244, and thereby, performs the insertion-extraction of the viewfinder variable-magnification lens 244 onto the optical axis L2.

The liquid crystal shutter control unit 239 (control device) controls the light-blocking state/non-light-blocking state of the liquid crystal shutter 243 (light-blocking device).

[Explanation of Behavior of Imaging Apparatus]

The procedure of the image recording by the imaging apparatus 100 that is configured as described above is explained. This process is controlled by the main CPU 251. A program to make the main CPU 251 execute this imaging process is stored in a program storage unit within the main CPU 251.

When the power supply is activated in a state in which the interchangeable lens 300 is being attached to the camera body 200 of the imaging apparatus 100, or when the interchangeable lens 300 is attached to the camera body 200 in a state in which the power supply of the camera body 200 is ON, the main CPU 251 (acquisition device) communicates with the interchangeable lens 300 by controlling the mount communication unit 250 (acquisition device), acquires the information (lens information) about the interchangeable lens 300 from the interchangeable lens 300, and acquires the focal distance of the interchangeable lens 300 based on the lens information. The information showing the focal distance may be directly acquired from the interchangeable lens 300, or, after the information showing the type of the interchangeable lens 300 is acquired from the interchangeable lens 300, the focal distance may be determined based on the information showing the type. Further, the main CPU 251 (acquisition device) in the example communicates with the interchangeable lens 300 by controlling the mount communication unit 250 (acquisition device), and acquires the position information about the zoom lens ZL and the position information about the focus lens FL, that is, the subject distance of the interchangeable lens 300.

Further, the main CPU 251 decides whether the viewfinder variable-magnification lens 244 of the viewfinder 240 is on the optical axis L2, and, based on this, acquires the angular filed of the optical image. That is, in the case where the viewfinder variable-magnification lens 244 is not on the optical axis L2 (in the case shown in FIG. 3), the main CPU 251 acquires that the optical image has a first angular field, which is standard. Further, in the case where the viewfinder variable-magnification lens 244 is on the optical axis L2 (in the case shown in FIG. 5), since the optical image is magnified by the viewfinder variable-magnification lens 244, the main CPU 251 acquires that the optical image has a second angular filed, which is narrower than the first angular field.

The main CPU 251 (image capture range determination device) calculates the position and size of a frame box F that is an image showing the range (image capture range) of a subject image to be captured in imaging element 202, based on the focal distance and subject distance of the interchangeable lens 300 and the angular filed of the optical image. That is, the main CPU 251 determines the image capture range (the range corresponding to the image capture range) in the optical image, based on the lens information acquired from the interchangeable lens 300. For example, the relation between the angular field of the optical image and the focal distance of the interchangeable lens 300 is stored in the flash ROM 226 (or a memory in the main CPU 251), and by referring to this, the size of the frame box F can be calculated. Further, for example, the relation between the angular field of the optical image and the subject distance is stored in the flash ROM 226 (or the memory in the main CPU 251), and by referring to this, the position of the frame box F can be calculated.

When the size of the frame box F is smaller than or equal to a range to be shown by the angular field of the optical image, the main CPU 251 (display control device) controls the display control unit 210 (display control device) to display the frame box F on the liquid crystal plate 248 such that the frame box F with the calculated size is displayed at the calculated position.

Figure 7:
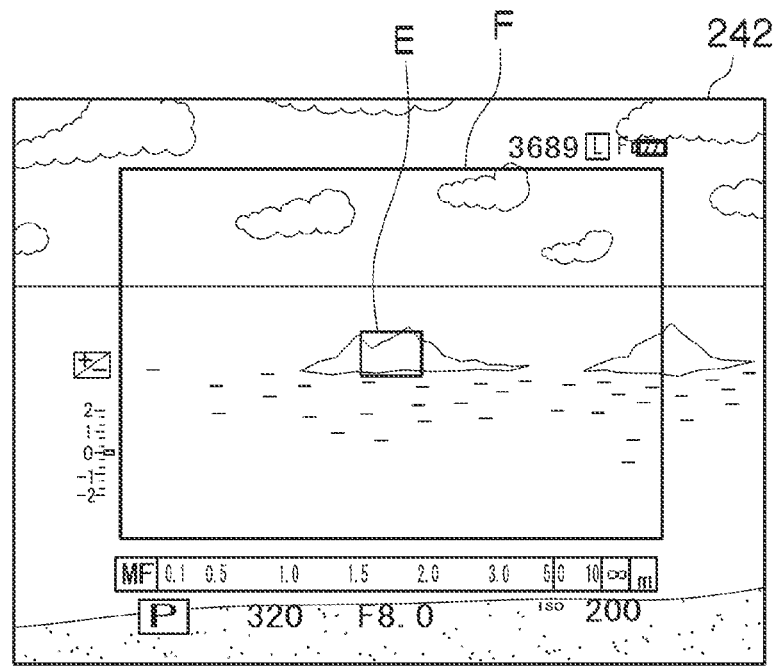
FIG. 7 is an exemplary display on the viewfinder when an image capture range is smaller than an optical image.
Figure 8:
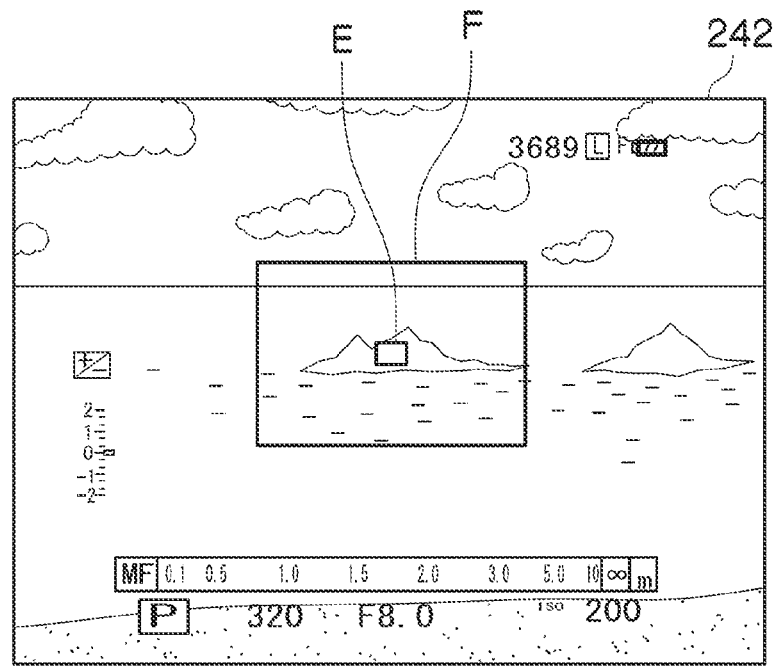
FIG. 8 is an exemplary display on the viewfinder when an image capture range is smaller than an optical image.

FIG. 7 is an exemplary display on the viewfinder when the viewfinder variable-magnification lens 244 is on the optical axis L2 and the focal distance of the interchangeable lens 300 is 35 mm. FIG. 8 is an exemplary display on the viewfinder when the viewfinder variable-magnification lens 244 is on the optical axis L2 and the focal distance of the interchangeable lens 300 is 60 mm. As shown in FIGS. 7 and 8, on the viewfinder 240, the frame box F corresponding to the focus distance is displayed so as to be overlapped on the optical image with the first angular field.

As the calculation result of the position and size of the frame box F, when the size of the frame box F is smaller than a predetermined size (for example, half of the optical image), relative to the range to be shown by the angular filed of the optical image, the main CPU 251 decides whether the viewfinder variable-magnification lens 244 is on the optical axis L2. When the viewfinder variable-magnification lens 244 is not on the optical axis L2, the main CPU 251 moves, through the viewfinder control unit 238, the viewfinder variable-magnification lens 244 from the position out of the optical axis L2 to the position on the optical axis L2, and then, sets the optical image to the second angular field. Then, by the previously explained method, the main CPU 251 (display control device) calculates the position and size of the frame box F again, and displays the frame box F on the liquid crystal plate 248.

Figure 9:
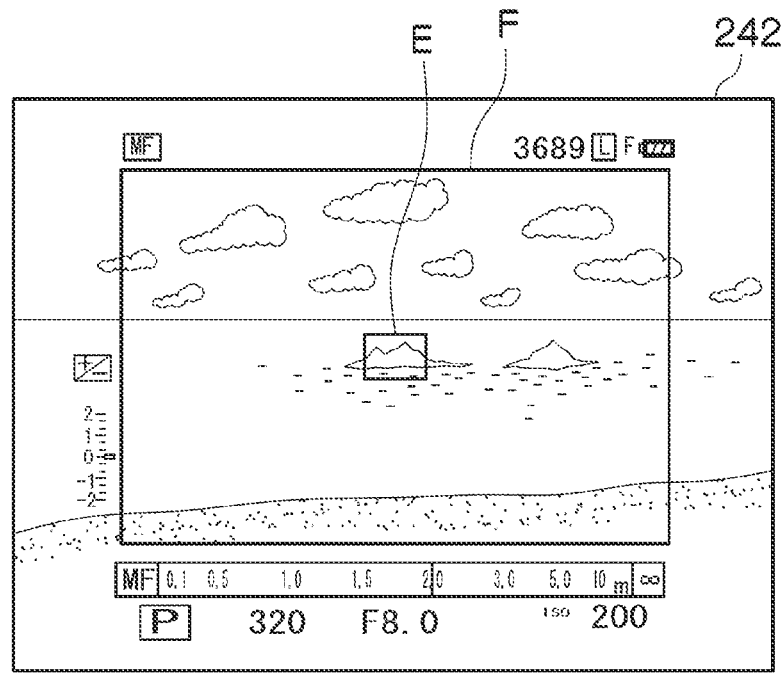
FIG. 9 is an exemplary display on the viewfinder when an image capture range is smaller than an optical image.

FIG. 9 is an exemplary display on the viewfinder when the viewfinder variable-magnification lens 244 is not on the optical axis L2 and the focal distance of the interchangeable lens 300 is 18 mm. When the focal distance of the interchangeable lens 300 is 18 mm, since the image capture range is broad and the size of the frame box F is large, the viewing is easy for a user. However, when the focal distance of the interchangeable lens 300 is longer, since the image capture range is narrower and the size of the frame box F is smaller, the viewing is difficult for a user. Therefore, as shown in FIG. 7, the frame box F corresponding to the focal distance is displayed on the viewfinder 240 so as to be overlapped on the optical image with the second angular field, which is a narrower angular field than the first angular field.

Here, in FIGS. 7 to 9, a box E showing the AF area is displayed at the vicinity of the center of the frame box F, but the display of the box E is not essential. The main CPU 251 can calculate the size and position of the box E, by the same method as the frame box F. Further, in FIGS. 7 to 9, as the image showing the image capture range, the frame box F is displayed, but the image showing the image capture range is not limited to this. It is possible to use various forms such as an image composed of four L-shapes that shows the corners, or an image in which a masking is performed outside the image capture range, for example. Here, the "L-shape" is not limited to a shape that completely coincides with the capital "L" of the alphabet. For example, the two line segments orthogonal to each other may be equal in length, or either line segment may be longer. Further, the two line segments may not be completely orthogonal.

As the calculation result of the position and size of the frame box F by the main CPU 251, there is also a case where the frame box F is larger than the range to be shown by the angular field of the optical image. In this case, the main CPU 251 decides whether the viewfinder variable-magnification lens 244 is on the optical axis L2. When the viewfinder variable-magnification lens 244 is on the optical axis L2, the main CPU 251 moves, through the viewfinder control unit 238, the viewfinder variable-magnification lens 244 from the position on the optical axis L2 to the position out of the optical axis L2, and then, sets the optical image to the first angular field. Then, by the previously explained method, the main CPU 251 calculates the position and size of the frame box F again, and displays the frame box F on the liquid crystal plate 248.

When the image capture range is larger than the first angular field, the main CPU 251 (display control device) controls the display control unit 210 (display control device), and displays, as an image different from the frame box F (first image), an image (second image) showing that the image capture range is larger than the range to be shown by the angular field of the optical image, on the liquid crystal plate 248.

Figure 10:
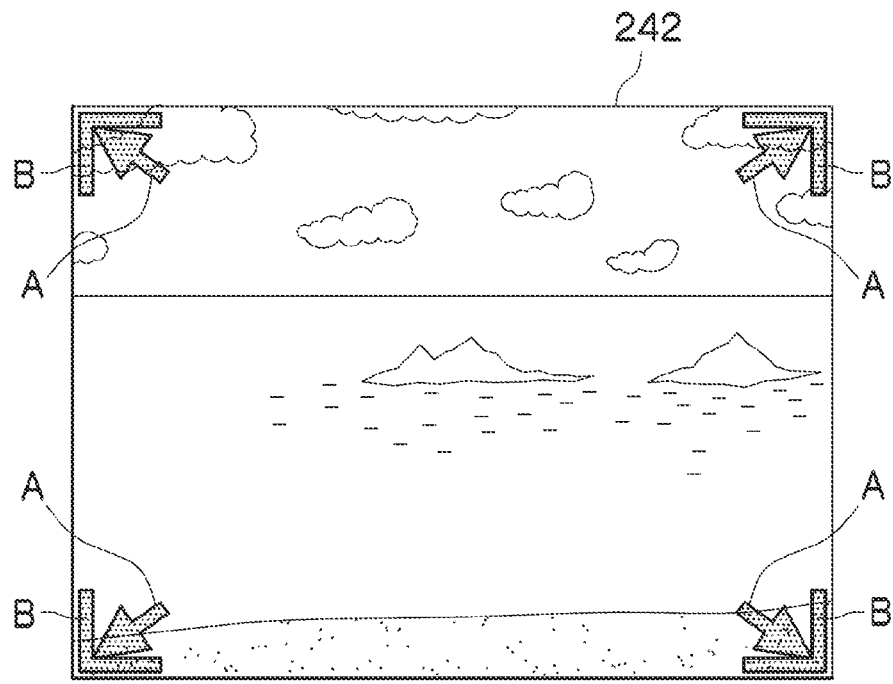
FIG. 10 is an exemplary display on the viewfinder when an image capture range is larger than an optical image.

FIG. 10 is an exemplary display on the viewfinder when displaying an image (second image) as an index showing that the image capture range is larger than the range to be shown by the angular field of the optical image. The main CPU 251 makes the liquid crystal plate 248 display, as the second image, arrows A containing a shape (arrowhead shape) in which the pointed end is oriented to the outward side of the optical image, such that the arrows A are superimposed on the four corner vicinities of the optical image. Further, the main CPU 251 makes the liquid crystal plate 248 display, as the second image, brackets B with an L-shape along the corner, such that the brackets B are displayed at the four corner vicinities of the optical image.

Here, although the arrows A and the brackets B are displayed so as to be overlapped on the optical image in FIG. 10, the image showing that the image capture range is larger than the range to be shown by the angular field of the optical image is not limited to this. For example, only either of the arrows A and the brackets B may be displayed so as to be overlapped on the optical image. Further, instead of the arrow A, only the arrowhead-shape part of the arrow A may be displayed. Examples of the arrowhead shape include all indexes (marks) having a shape in which the pointed end is oriented to the outward side of the optical image, such as a V-shape and a triangle shape. Further, the arrows A may be displayed outward, at the four side vicinities (for example, at roughly central positions of each of the sides) of the optical image. Further, bar-shaped images along the sides may be displayed at vicinities of each of the four sides. Moreover, as the image showing that the image capture range is larger than the range to be shown by the angular field of the optical image, an image such as a box along the edge of the optical image, or the arrows A and brackets B may be displayed so as to blink.

Figure 11:
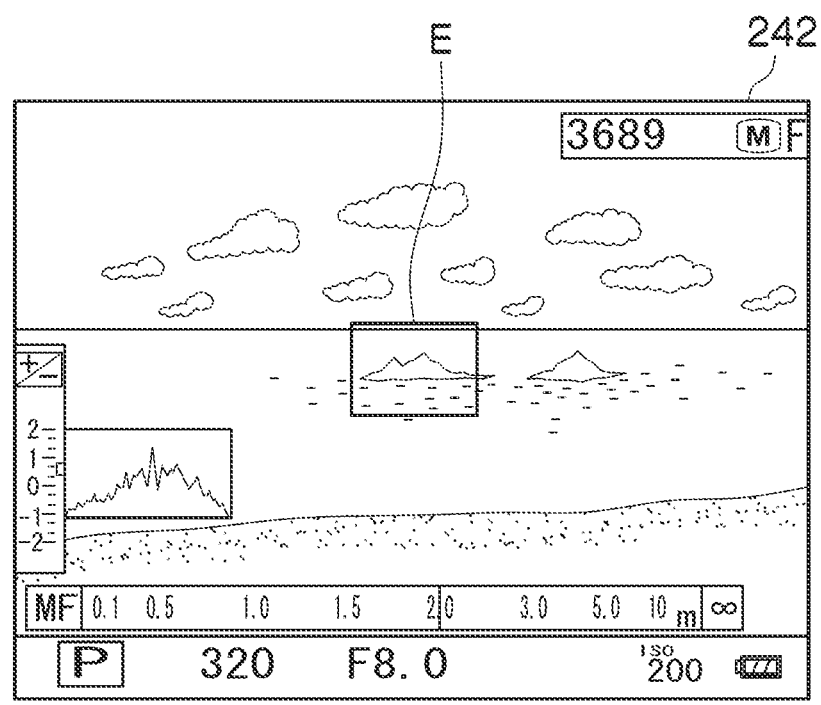
FIG. 11 is an exemplary display on the viewfinder when an electronic viewfinder is used.

When, in this way, a user recognizes that the image capture range is broader than the optical image, a user can display the electronic image on the viewfinder 240. Once a user operates the viewfinder switching lever 214, the main CPU 251 recognizes this, closes the liquid crystal shutter 243 such that it becomes the entire light-blocking state, and makes the optical image of the subject image impossible to view. Moreover, the main CPU 251 sequentially gives, to the display control unit 210, the image data generated based on the output of the imaging element 202. The display control unit 210 inverts the input image data, and converts them into a signal format for display on the monitor, to perform the output to the liquid crystal plate 248. Thereby, the subject image (image capture image) formed on the imaging element 202 is led to the viewfinder eyepiece unit 242, and the display on the viewfinder 240 is switched to the electronic image shown in FIG. 11 (electronic viewfinder). When being switched to the electronic image shown in FIG. 11, the main CPU 251 makes the liquid crystal plate 248 display the box E showing the AF area, in addition to the image data.

Also, the main CPU 251 sequentially gives, to the display control unit 210, the image data generated based on the output of the imaging element 202, and the display control unit 210 converts the input image data into the signal format for display on the monitor, to output them to the monitor 213. Thereby, it is possible to display the capture image on the monitor 213.

Thus, the image capture preparation is completed. A user performs a zooming and the like, while looking through the viewfinder eyepiece unit 242. After the determination of the angular field, the user inputs the image capture indication by pushing the release button 211.

When the first-step push (half-push) of the release button 211 is performed, the image capture preparation behavior is indicated to the main CPU 251. That is, the main CPU 251 starts the AF and AE behaviors, and in response to this, the image data output from the A/D converter 204 are taken in the AF detection unit 227 and the AE/AWB detection unit 229 so that the AE behavior and the AF behavior are performed.

Further, when the half-push of the release button 211 is performed, the main CPU 251 deletes, from the liquid crystal plate 248, the frame box F and the image (in the embodiment, the arrows A and the brackets B) showing that the image capture range is larger than the range to be shown by the angular field of the optical image. Thereby, after the half-push of the release button 211 is performed, the frame box F and the image showing that the image capture range is larger than the range to be shown by the angular field of the optical image are not displayed on the viewfinder 240.

When the AE behavior and the AF behavior are completed and the second-step push (full-push) of the release button 211 is performed, the image capture behavior is indicated to the main CPU 251. That is, based on a reading signal to be given from the imaging element control unit 201, the signal electric charges accumulated in the imaging element 202 are read as a voltage signal corresponding to the signal electric charges, and are given to the analog signal processing unit 203. The analog signal processing unit 203 performs the sampling hold of the R, G and B signals of each pixel, by the correlated double sampling process to the voltage signal output from the imaging element 202, and, after the amplification, gives them to the A/D converter 204. The A/D converter 204 converts the analog R, G and B signals to be sequentially input, into digital R, G and B signals, and outputs them to the image input controller 205.

The image data output from the image input controller 205 are input to the digital signal processing unit 206, and signal processes such as the offset process, the gain control process including the white balance correction and the sensitivity correction, the gamma correction process, and the YC process, are performed. After the writing/reading to a VRAM 230, the image data are encoded in the display control unit 210, and are output to the monitor 213. Thereby, the subject image is displayed on the monitor 213.

Further, in response to the full-push of the release button 211, the image data output from the A/D converter 204 are input from the image input controller 205 to the SDRAM (memory) 232, and are temporarily stored. After the temporal storage to the SDRAM 232, signal processes such as the gain control process, gamma correction process and YC process in the digital signal processing unit 206, the compression process to the JPEG (joint photographic experts group) format in the compression/decompression processing unit 208, and the like are performed, and then, an image file is generated. The image file is read by the medium control unit 234, and is stored in the memory card 236. The image stored in the memory card 236 can be played back and displayed on the monitor 213, by operating a playback button of the operation unit 220.

As explained above, the imaging apparatus 100 according to the embodiment includes: the camera mount (the mount 256) on which the interchangeable lens 300 is mounted; the image capture device (the imaging element 202) for acquiring the capture image, based on the subject light transmitted through the interchangeable lens 300; the optical viewfinder (the optical viewfinder of the viewfinder 240) for leading the roughly rectangular optical image of a subject to the eyepiece unit (the viewfinder eyepiece unit 242), through the path different from the capture image; the display device (the liquid crystal plate 248 of the viewfinder 240) for displaying an image; the image superimposition device (the prism 246 of the viewfinder 240) for superimposing the image displayed by the display device (the liquid crystal plate 248 of the viewfinder 240) on the optical image, and leading the image to the eyepiece unit (the viewfinder eyepiece unit 242); the acquisition device (the main CPU 251 and the mount communication unit 250) for acquiring information (the lens information) about the interchangeable lens 300 mounted on the camera mount (the mount 256); the image capture range determination device (the main CPU 251) for determining the image capture range, which is the range in the optical image that corresponds to the capture image, based on the acquired lens information; and the display control device (the main CPU 251 and the display control unit 210) for making the display device (the liquid crystal plate 248 of the viewfinder 240) display the first image (for example, the frame box F) showing the image capture range in the optical image, when the image capture range is smaller than or equal to the range to be shown by the angular field of the optical image, and making the display device (the liquid crystal plate 248 of the viewfinder 240) display the second image (the index) different from the first image, such that the second image is superimposed on the four corner vicinities (or the four side vicinities) of the optical image, when the image capture range is larger than the range to be shown by the angular field of the optical image.

According to the embodiment, even when the image capture range is broader than the optical image, a user can comprehend that, easily and intuitively.

Here, in the embodiment, when the size of the frame box F is larger than the range to be shown by the angular field of the optical image, the main CPU 251 displays the image showing that the image capture range is larger than the range to be shown by the angular field of the optical image, such that it is overlapped on the optical image, but, may calculate the extent by which the size of the frame box F (image capture range) exceeds the range to be shown by the angular field of the optical image (the difference between the largeness of the frame box F and the largeness of the range to be shown by the angular field of the optical image), and may alter the size, color, brightness, shape and others of the image (index) showing that the image capture range is larger than the range to be shown by the angular field of the optical image, based on the extent by which the size of the frame box F exceeds the range to be shown by the angular field of the optical image. For example, when the length of the side of the frame box F is less than or equal to 110% of the length of the side of the optical image, the color of the image showing that the image capture range is larger than the range to be shown by the angular field of the optical image may be yellow, and when the length of the side of the frame box F is greater than 110%, the color of the image showing that the image capture range is larger than the range to be shown by the angular field of the optical image may be red.

Second Embodiment

In the first embodiment, when the frame box F is larger than the range to be shown by the angular field of the optical image, the main CPU 251 makes the liquid crystal plate 248 display the image (for example, the arrows A and the brackets B) showing that the image capture range is larger than the range to be shown by the angular field of the optical image, and it is displayed so as to be overlapped on the optical image. However, the form for showing that the image capture range is larger than the range to be shown by the angular field of the optical image is not limited to this.

A second embodiment of the present invention adopts a form in which an image showing the relation between the image capture range and the range to be shown by the angular field of the optical image is displayed as the image showing that the image capture range is larger than the range to be shown by the angular field of the optical image. Here, the second embodiment and the first embodiment are different only in the display of the image showing the relation between the image capture range and the range to be shown by the angular field of the optical image. Therefore, only this difference is explained, and the other explanations are omitted.

Figure 12:
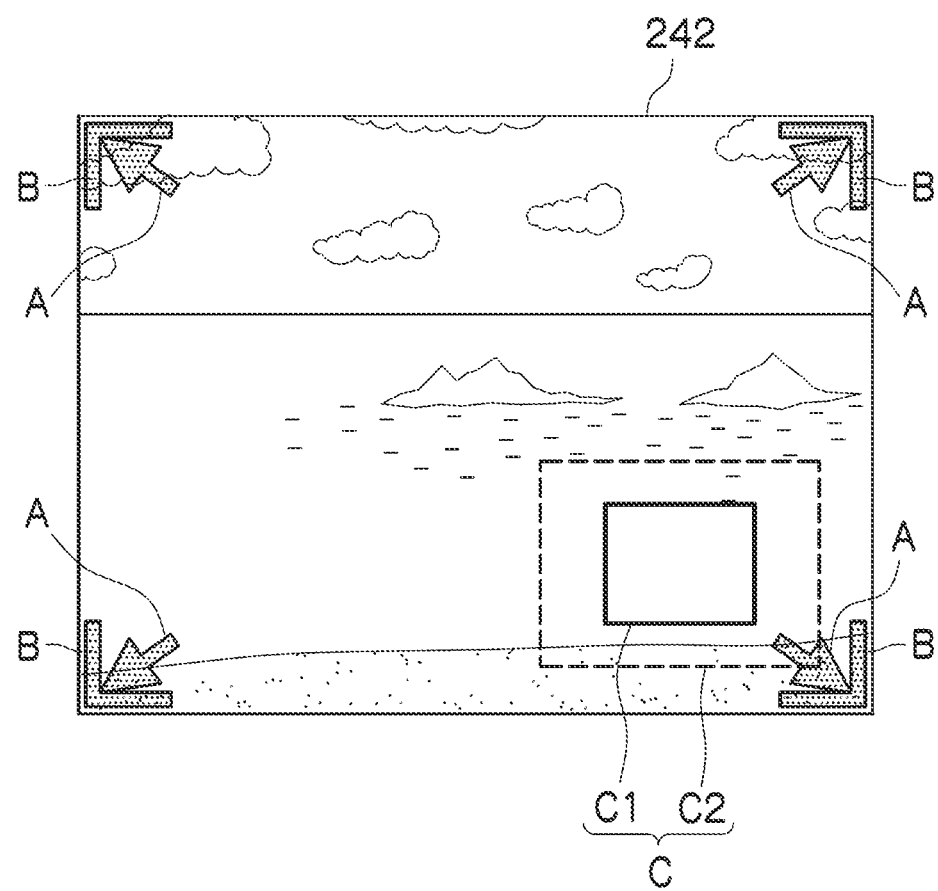
FIG. 12 is an exemplary display on the viewfinder when an image capture range is larger than an optical image.

The main CPU 251 controls the display control unit 210 to display, on the liquid crystal plate 248, the image showing that the image capture range is larger than the angular field of the optical image, as the image different from the frame box F. FIG. 12 is an exemplary display on the viewfinder when displaying the image showing that the image capture range is larger than the angular field of the optical image.

The main CPU 251 makes the liquid crystal plate 248 display the arrows A and the brackets B such that the arrows A and the brackets B are displayed on the four corner vicinities of the optical image.

Moreover, the main CPU 251 acquires the information showing whether the viewfinder variable-magnification lens 244 is on the optical axis L2 (that is, the information showing whether the angular field of the optical image is the first angular field or the second angular field), and the focal distance of the interchangeable lens 300, and, based on such information, calculates the relation between the range to be shown by the angular field of the optical image and the image capture range. This can be obtained by referring to the relation between the angular field of the optical image and the focal distance that is stored in the memory of the main CPU 251, and the like. Then, as shown in FIG. 12, the main CPU 251 makes the liquid crystal plate 248 display an image C in which a box C1 showing the range to be shown by the angular field of the optical image and a box C2 showing the image capture range are displayed so as to be overlapped. Thereby, the arrows A, the brackets B and the image C are displayed so as to be superimposed on the optical image.

According to the embodiment, as the image showing that the image capture range is larger than the range to be shown by the angular field of the optical image, the image showing the relation between the image capture range and the range to be shown by the angular field of the optical image is displayed so as to be overlapped on the optical image. Therefore, a user can intuitively recognizes that the image capture range is larger than the optical image, and to what extent the image capture range runs over the range to be shown by the angular field of the optical image.

In the embodiment, the box C1 showing the range to be shown by the angular field of the optical image is displayed by a solid line, and the box C2 showing the image capture range is displayed by a dotted line. However, the image C is not limited to this. For example, the box C1 showing the range to be shown by the angular field of the optical image, and the box C2 showing the image capture range may be displayed differently in color.

Third Embodiment

In the first embodiment, when the frame box F is larger than the range to be shown by the angular field of the optical image, the main CPU 251 makes the liquid crystal plate 248 display the arrows A and the brackets B, as the image showing that the image capture range is larger than the range to be shown by the angular field of the optical image, and it is displayed so as to be overlapped on the optical image. However, a user cannot check a region that is in the image capture range and that is beyond the range to be shown by the angular field of the optical image.

A third embodiment of the present invention adopts a form in which, when the image capture range is larger than the range to be shown by the angular field of the optical image, an image in the image capture range and in a region beyond the range to be shown by the angular field of the optical image is displayed. Here, the third embodiment and the first embodiment are different only in the display when the image capture range is larger than the range to be shown by the angular field of the optical image. Therefore, only this difference is explained, and the other explanations are omitted.

The main CPU 251 controls the display control unit 210 to display, on the liquid crystal plate 248, the arrows A and the brackets B, which are images different from the frame box F, as the image showing that the image capture range is larger than the range to be shown by the angular field of the optical image.

Moreover, when the cross key 221 is operated, the main CPU 251 displays, on the liquid crystal plate 248 with the optical image, an image (hereinafter, referred to as a "run-over image") that is in the capture image and in regions beyond the range to be shown by the angular field of the optical image, and that runs over in the direction indicated by the cross key 221. The nm-over image is an image that corresponds to the run-over region (the region exceeding the range to be shown by the angular field of the optical image) in the indicated direction. In order to allow for the check of the direction indicated by the cross key 221, the nm-over image is displayed on the liquid crystal plate 248, so as to be superimposed on the optical image, along the edge part of the optical image in the direction indicated by the cross key 221.

Figure 13:
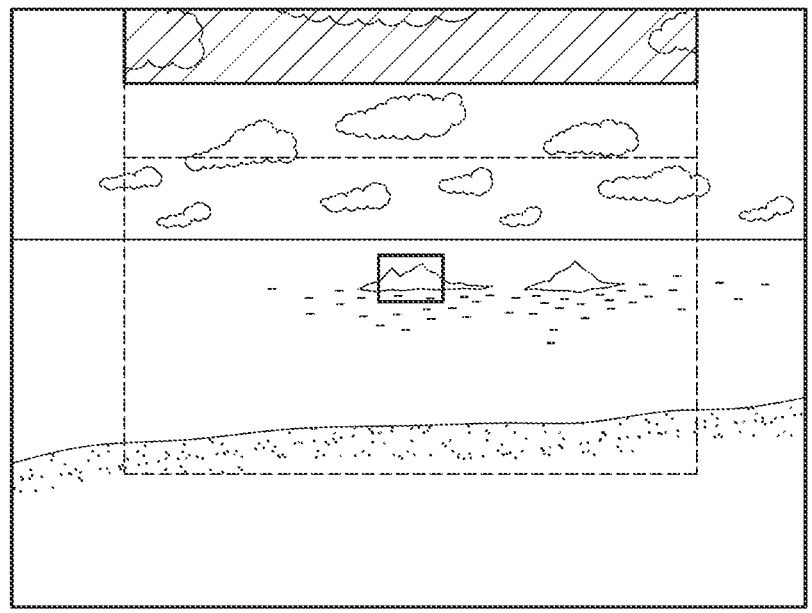
FIG. 13 is a diagram for explaining a run-over image.

A case where the indication of the upward direction is input by the cross key 221 is explained as an example. First, the information showing whether the viewfinder variable-magnification lens 244 is on the optical axis L2, and the focal distance of the interchangeable lens 300 are acquired, and, based on such information, the relation between the range to be shown by the angular field of the optical image and the image capture range is calculated. FIG. 13 is a diagram showing the relation between the range to be shown by the angular field of the optical image and the image capture range. In FIG. 13, the outer solid line represents the image capture range, and the inner dotted line represents the range to be shown by the angular field of the optical image. Since the indication of the upward direction has been input by the cross key 221, the hatching region on the upper side to the dotted line is the region of the run-over image. Then, the main CPU 251 displays the image in the hatching region in FIG. 13, on the liquid crystal plate 248, such that the image in the hatching region is displayed along the upper edge of the optical image (the region surrounded by the dotted line in FIG. 13). As a result, the image in the hatching region in FIG. 13 is superimposed and displayed along the upper edge of the optical image, as shown in FIG. 14.

Figure 14:
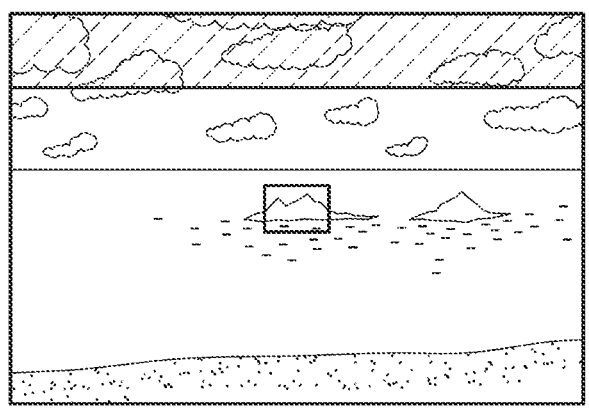
FIG. 14 is an exemplary display on the viewfinder when the run-over image is displayed.

Here, in FIG. 14, the arrows A and the brackets B are not displayed in the region where the run-over image has been displayed, but the arrows A and the brackets B may be also displayed in the region where the run-over image has been displayed.

According to the embodiment, a user can check the appearance of a subject that is contained in the image capture range and that is in a part running over the optical image, while viewing the optical image.

Here, in the embodiment, the run-over image is displayed so as to be superimposed on the optical image, that is, the run-over image and the optical image are each displayed in a semi-transparent manner. However, only the run-over image may be displayed, and the optical image may be hidden in the region where the run-over image is displayed. Concretely, the main CPU 251 only has to control the liquid crystal shutter 243 through the liquid crystal shutter control unit 239, such that a region in the liquid crystal shutter 243 that corresponds to the run-over image display region (the region surrounded by the dotted line in FIG. 13) in the liquid crystal plate 248 is in the light-blocking state.

So far, the present invention has been explained using the embodiments, but the technical scope of the present invention is not limited to the scope described in the above embodiments. It is obvious to those skilled in the art that various modifications and improvements can be made to the above embodiments. As is obvious from the description in the claims, modes in which such modifications and improvements have been made can also fall within the technical scope of the present invention.

Further, although the digital camera has been explained as the embodiments of the image capture apparatus according to the present invention, the configuration of the image capture apparatus is not limited to this. Examples of another image capture apparatus according to the present invention can include a portable terminal apparatus having an image capture function such as a built-in or external PC camera.

What is claimed is:
1. An interchangeable-lens camera comprising:
 a camera mount on which an interchangeable lens is mounted;

an image capture device for acquiring a capture image, based on subject light transmitted through the interchangeable lens;

an optical viewfinder for leading a rectangular optical image of a subject to an eyepiece unit, through a path different from the capture image;

a display device for displaying an image;

an image superimposition device for superimposing the image displayed by the display device on the optical image, and leading the image to the eyepiece unit;

an acquisition device for acquiring information about the interchangeable lens mounted on the camera mount;

an image capture range determination device for determining an image capture range in the optical image, based on the acquired information about the interchangeable lens, the image capture range being a range corresponding to the capture image; and a display control device for making the display device display a first image, when the image capture range is smaller than or equal to a range to be shown by an angular field of the optical image, and making the display device display a second image such that the second image is superimposed on at least either of four corner vicinities and four side vicinities of the optical image, when the image capture range is larger than the range to be shown by the angular field of the optical image, the first image showing the image capture range in the optical image, the second image being different from the first image.

2. The interchangeable-lens camera according to claim 1, wherein the image capture range determination device calculates an extent by which the image capture range exceeds the range to be shown by the angular field of the optical image, and the display control device alters at least one of size, color, brightness and shape of the second image, based on the calculated extent by which the image capture range exceeds the range to be shown by the angular field of the optical image.

3. The interchangeable-lens camera according to claim 1, wherein the display control unit makes the display device display an image showing a relation between the image capture range and the range to be shown by the angular field of the optical image, when the image capture range is larger than the range to be shown by the angular field of the optical image.

4. The interchangeable-lens camera according to claim 1, wherein the display control device displays an image containing an index, as the second image, the index having a shape in which a pointed end is oriented outward.

5. The interchangeable-lens camera according to claim 1, wherein the display control device displays an image containing an L-shape, as the second image, the L-shape being along a corner of the display device.

6. The interchangeable-lens camera according to claim 1, wherein the display control device makes the display device display the capture image acquired by the image capture device.

7. The interchangeable-lens camera according to claim 6, comprising an operation unit for indicating a direction in the optical image, wherein, when the direction is indicated by the operation unit, the display control device makes the display device display an image (hereinafter, referred to as a "run-over image") that is in the capture image and in regions beyond the range to be shown by the angular field of the optical image, and that corresponds to a region exceeding the range to be shown by the angular field of the optical image in the indicated direction.

8. The interchangeable-lens camera according to claim 7, wherein the interchangeable-lens camera makes the display device display the run-over image such that the run-over image is superimposed on an edge part in the indicated direction of the optical image.

9. The interchangeable-lens camera according to claim 6, comprising:

a light-blocking device disposed on an optical path in the optical viewfinder, the light-blocking device being able to switch between a light-blocking state and a non-light-blocking state for each region, the light-blocking state being a state in which the optical image cannot be viewed through the eyepiece unit; and a control device for putting a region of the light-blocking device into the light-blocking state, when the run-over image is displayed on the display device, the region of the light-blocking device corresponding to a region where the run-over image is displayed.

10. A viewfinder display method to be performed by an interchangeable-lens camera comprising: an image capture device for acquiring a capture image, based on subject light transmitted through an interchangeable lens that is mounted by intermediary of a camera mount; an optical viewfinder for leading a rectangular optical image of a subject to an eyepiece unit, through a path different from the interchangeable lens; a display device; and an image superimposition device for superimposing the image displayed by the display device on the optical image, and leading the image to the eyepiece unit, the viewfinder display method comprising:

a step for acquiring information about the interchangeable lens mounted on the camera mount;

a step for determining an image capture range in the optical image, based on the acquired information about the interchangeable lens, the image capture range being a range corresponding to the capture image; and a step for making the display device display a first image, when the image capture range is smaller than or equal to a range to be shown by an angular field of the optical image, and making the display device display a second image such that the second image is superimposed on at least one of four corner vicinities and four side vicinities of the optical image, when the image capture range is larger than the range to be shown by the angular field of the optical image, the first image showing the image capture range in the optical image, the second image being different from the first image.

* * * * *